(12) United States Patent
Beaver (10) Patent No.: US 12,316,634 B2
(45) Date of Patent: May 27, 2025

(54) VIRTUAL AGENT TRUST MECHANISM

(71) Applicant: Verint Americas Inc., Alpharetta, GA (US)

(72) Inventor: Ian Beaver, Spokane, WA (US)

(73) Assignee: Verint Americas Inc., Alpharetta, GA (US)

( * ) Notice: Subject to any disclaimer, the term of this patent is extended or adjusted under 35 U.S.C. 154(b) by 207 days.

(21) Appl. No.: 18/152,677

(22) Filed: Jan. 10, 2023

(65) Prior Publication Data

US 2024/0236094 A1  Jul. 11, 2024

(51) Int. Cl.
*G06F 21/00* (2013.01)
*H04L 9/40* (2022.01)

(52) U.S. Cl.
CPC .............. *H04L 63/10* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 9,137,224 B2 * | 9/2015 | Kuang | H04L 63/08 |
| 9,166,975 B2 * | 10/2015 | Kuang | H04L 63/0838 |
| 10,356,243 B2 * | 7/2019 | Sanghavi | H04L 51/02 |
| 11,196,863 B2 * | 12/2021 | Spohrer | H04M 3/5175 |
| 11,412,013 B2 * | 8/2022 | Hughes | H04L 67/133 |
| 11,468,381 B1 * | 10/2022 | Harris | G06F 16/9035 |
| 2012/0005476 A1 * | 1/2012 | Wei | H04L 63/0272 713/153 |
| 2018/0302496 A1 * | 10/2018 | Tarasenko | H04L 67/34 |
| 2022/0141662 A1 * | 5/2022 | Liao | H04W 12/37 726/1 |

\* cited by examiner

*Primary Examiner* — Maung T Lwin
(74) *Attorney, Agent, or Firm* — Dinsmore & Shohl LLP (57) ABSTRACT

Certain aspects of the present disclosure provide techniques for receiving, from a user, a command for a virtual assistant to perform a task on behalf of the user; determining a communication channel for the virtual assistant to communicate with a remote service in order to perform the task; registering a communication session with an identity provider service, wherein the communication session is associated with the communication channel; initiating the communication session with the remote service using the communication channel; receiving a communication session authentication query from the remote service; and determining, in response to the communication session authentication query, whether the user is authenticated.

19 Claims, 5 Drawing Sheets

VIRTUAL AGENT TRUST MECHANISM

INTRODUCTION

Aspects of the present disclosure relate to systems and methods for establishing trust between a virtual assistant and a remote service.

A virtual assistant, sometimes also referred to as an intelligent virtual assistant (IVA), is a software agent that assists users by performing tasks or services based on questions or commands provided by a user. Users often interact with virtual assistants on a user device through natural language spoken or written word. For example, users may ask a virtual assistant to retrieve information or complete a transaction. A virtual assistant may interpret the user's request and determine a particular task for the virtual assistant to perform. A virtual assistant may then perform the task on behalf of the user. Virtual assistants improve users' lives by automating and performing tasks on behalf of the user. Increasingly, virtual assistants are being used by consumers and businesses alike.

In some instances, a user may request a virtual assistant to perform a task requiring the virtual assistant to interact with a third party, such as a remote service. Ideally, the virtual assistant would connect to and perform the task with a third party without requiring any further action from the user. However, many third party services have security measures that prevent performing certain tasks without first authenticating the requesting party. This presents a technical problem in which the third party service cannot directly verify the identity of the user for which the virtual assistant is acting and thus cannot complete the requested task without user intervention. Even when a virtual assistant is associated with a user account or specific user device, a third party service cannot be certain an authentic user is directing the virtual assistant. Conventionally, the third party will require the actual user to authenticate directly with the third party, which defeats the purpose and convenience of using the virtual assistant. Practically, this means that virtual assistants are often unable to perform tasks without user intervention, which reduces their utility.

Accordingly, there is a need for improved methods for establishing trust with a virtual assistant.

SUMMARY

A first aspect provides a method, comprising: receiving, from a user, a command for a virtual assistant to perform a task on behalf of the user; determining a communication channel for the virtual assistant to communicate with a remote service in order to perform the task; registering a communication session with an identity provider service, wherein the communication session is associated with the communication channel; initiating the communication session with the remote service using the communication channel; receiving a communication session authentication query from the remote service; and determining, in response to the communication session authentication query, whether the user is authenticated.

A second aspect provides a method, comprising: receiving a communication session using a communication channel to initiate performance of a task on behalf of a user; sending a communication session authentication query to determine whether the user is authenticated; and determining the communication session is expected.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for establishing a trust relationship with a virtual assistant.

Virtual assistants, such as Intelligent Virtual Assistants (IVAs), may perform many different tasks on behalf of users by, in some cases, contacting and exchanging information with third party services. For example, a user may request a virtual assistant to make a dinner reservation, book a hotel room, or update account information through a natural language request uttered to the virtual assistant.

However, third party services often bear the risk of fraudulent activity through their service and thus generally require a means of verifying that a virtual assistant is acting on behalf of an authentic user. By way of example, a third party service may not authorize a transaction requested by a virtual assistant until the end user directing the virtual assistant is authenticated by the third party. Consequently, a user often needs to directly interact with the third party service to complete a request made through the virtual assistant, which greatly reduces the benefit of the virtual assistant. Moreover, this inconvenience may cause the user to avoid one or both of the virtual assistant and the third party service.

Thus, there exists a technical problem of how a third party can authenticate a user without directly interacting with the user in order to perform tasks initiated by a virtual assistant on behalf of the user. In other words, how can the third party establish a trust relationship with the virtual assistant so that it may act autonomously on behalf of the user? Further, because a virtual assistant may be capable of requesting and performing a large variety of tasks, the third party may additionally need to determine the extent to which the virtual assistant is allowed to act on behalf of the user (e.g., to perform certain tasks on behalf of the user, but not others), even if a trust relationship exists. For example, the third party may be authorized to provide account information, such as a balance of a bank account, but not to change account information, such as changing contact details associated with the account.

Aspects described herein provide technical solutions to the aforementioned technical problems. As described in more detail below, aspects described herein may use an identity provider service to establish a trust relationship with a virtual assistant (e.g., between a third party and a virtual assistant) by pre-registering communication sessions initiated by an authenticated user with the identity provider service and confirming that an inbound communication session initiated by a virtual assistant is registered and thus on behalf of an authorized user. Beneficially, such aspects may enable a virtual assistant to complete tasks on behalf of users while also allowing third parties to trust the virtual assistant seeking to perform a task is allowed to do so without requiring direct intervention by the user.

Example System for Establishing Trust with a Virtual Assistant

Figure 1:
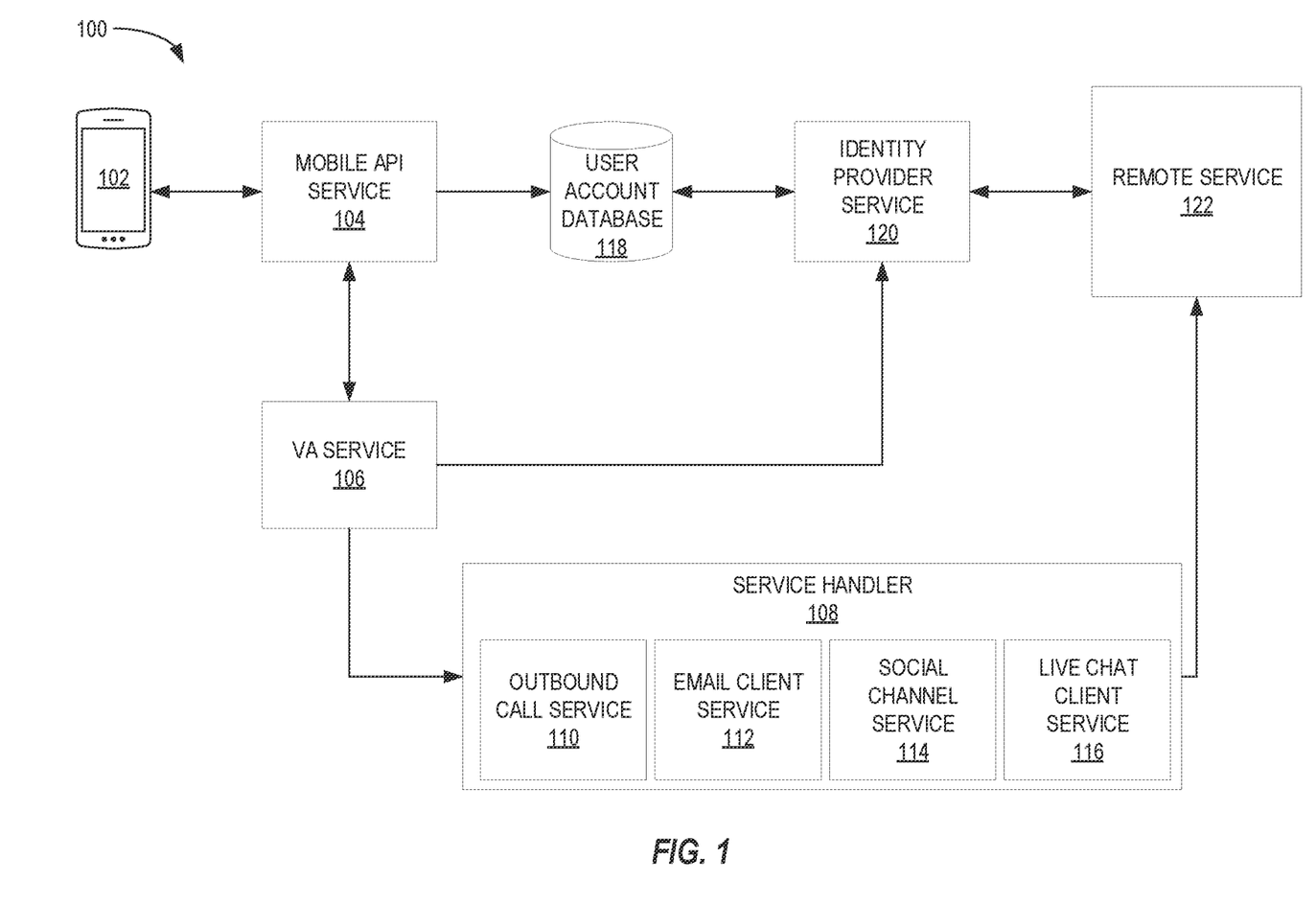
FIG. 1 depicts an example system for establishing trust of a virtual assistant.

FIG. 1 depicts an example system 100 for establishing trust with a virtual assistant.

Generally, a user wishing to have a virtual assistant perform some task with a remote service 122 on their behalf, may interact with user device 102 (e.g., utter or enter a command into user device 102). In response, user device 102 connects with a virtual assistant service 106. In the depicted embodiment, virtual assistant service 106 is communicatively coupled with user device 102 through mobile API service 104. Thus, in the depicted embodiment, mobile API service 104 routes all communication and data between user device 102 and virtual assistant service 106.

Note that while user device 102 is depicted throughout as a mobile smart device, in this case a smart phone, any electronic device with the capability to interact with a user (e.g., to receive a user command or query) and connect with virtual assistant service 106 might similarly implement the methods described herein. For example, user device 102 could be a tablet computer, desktop computer, a smart home device (e.g., a smart speaker), a smart wearable device, or generally any computer processing device with the ability to receive data from a user (e.g., through a user interface) and connect to virtual assistant service 106.

Virtual assistant service 106 is configured to determine an appropriate channel to contact remote service 122. Virtual assistant service 106 may use various communication channels, including, for example, phone calls, emails, social media communications, text messages, live chats, and other communication channels.

In some embodiments, virtual assistant service 106 determines a communication channel to contact remote service 122 based on a characteristic of a task, for example, the type or complexity of a task. In some embodiments, virtual assistant service 106 determines a communication channel to contact remote service 122 based on which communication channels the virtual assistant has been trained on. For example, virtual assistant service 106 may be trained to book a flight over a conversational communication channel such as a phone call, text message, or live chat, but not through social media or email. In some embodiments, virtual assistant service 106 determines a communication channel to contact a remote service 122 based on a characteristic of the remote service 122, such as the type of the remote service, availability of various communication channels for the remote service, or preferred communication channels of the remote service. In some embodiments, virtual assistant service 106 determines a communication channel to contact a remote service 122 based on current expected wait times across various communication channels. In some embodiments, virtual assistant service 106 determines a communication channel to contact a remote service 122 based on a cost to remote service 122 associated with a communication channel. For example, virtual assistant service 106 contacting remote service 122 via a phone call may be higher cost than a live chat for remote service 122 and virtual assistant service 106 may user the lower cost live chat.

Virtual assistant service 106 is further configured to register a communication session with identity provider service 120. In some embodiments, registering a communication session includes indicating the selected communication channel (e.g., phone call, email, social media communication, text message, or live chat) through which virtual assistant service 106 will contact the remote service 122 to perform a task on behalf of the user. Generally, virtual assistant service 106 then uses an appropriate service handler 108 to contact the remote service 122 on the selected communication channel.

For example, virtual assistant service 106 may use outbound call service 110 to contact remote service 122 by way of a phone call or text message, email client service 112 to contact remote service 122 by way of an email, social channel service 114 to contact remote service 122 by way of a social media communication (e.g., a direct message, a post, etc.), live chat service 116 to contact remote service 122 by way of chat messages, and the like.

Identity provider service 120 is configured to authenticate the user. In some embodiments, identity provider service 120 authenticates a user every time the user initiates a new task with virtual assistant service 106. For example, identity provider service 120 may authenticate the user when the user launches virtual assistant service 106, such as through a mobile app on user device 102, and the user is authenticate for a single session with the virtual assistant service 106. In some embodiments, identity provider service 120 authenticates a user when virtual assistant service 106 determines the task requires authentication. For example, if a user is using a virtual assistant on a smart speaker device, the smart speaker device may be always on and identity provider service 120 authenticates the user when the task requires the user to be authenticated, such as when a user needs to be logged into a user account, or for executing purchases, etc. A user may be authenticated, for example, through password-based authentication, multi-factor authentication, certificate-based authentication, biometric authentication, token-based authentication, or any other method of user authentication. Identity provider service 120 stores proof of the user authentication in user account database 118.

Identity provider service 120 is further configured to receive a communication session authentication query from the remote service 122, where the query is used to determine whether virtual assistant service 106 is associated with an authenticated user. Remote service 122 provides contact information for the selected communication channel (e.g., an origin telephone number, email account, social media account, chat identity, or the like) associated with the communication session as part of the communication session authentication query. Identity provider service 120 determines whether the communication session was registered with identity provider service 120 based on the provided contact information for the selected communication channel.

For example, when virtual assistant service 106 initiates a communication session with remote service 122 through outbound call service 110, identity provider service 120 may receive a communication session authentication query from remote service 122, querying whether a registered communication session is associated with an origin phone number used for the telephone call by virtual assistant service 106.

As another example, when virtual assistant service 106 initiates a communication session with remote service 122 through email client service 112, identity provider service 120 may receive a communication session authentication query from remote service 122, querying whether a registered communication session is associated with an email account used to send an email by virtual assistant service 106.

As another example, when virtual assistant service 106 initiates a communication session with remote service 122 through social channel service 114, identity provider service 120 may receive a communication session authentication query from remote service 122, querying whether a registered communication session is associated with a social media account used to send an social media communication, such as a direct message, a post, etc., by virtual assistant service 106.

As another example, when virtual assistant service 106 initiates a communication session with remote service 122 through live chat service 116, identity provider service 120 may receive a communication session authentication query from remote service 122, querying whether a registered communication session is associated with a chat identity used to send a live chat by virtual assistant service 106. These are just a few examples, but many others are possible.

If identity provider service 120 determines that no communication session was registered with identity provider service 120 based on the provided contact information for the selected communication channel, then identity provider service 120 sends an indication to remote service 122 that the communication session is not expected.

If identity provider service 120 determines that a communication session was registered with identity provider service 120 based on the provided contact information for the selected communication channel, then identity provider service 120 sends an indication to remote service 122 that the communication session is expected.

Identity provider service 120 is further configured to determine that the user associated with the registered communication session has been authenticated. In some cases, identity provider service 120 obtains a proof of user authentication stored in user account database 118. Identity provider service 120 can then send the proof of user authentication to remote service 122 to prove that the user that initiated the registered communication session is authentic.

Once proof of user authentication is sent to remote service 122, trust is established between virtual assistant service 106 and remote service 122, allowing virtual assistant service 106 to perform the task on behalf of the user. For example, the task may include completing a transaction, enabling or disabling a service, retrieving account information, updating account information, querying the status of a shipment or transaction, scheduling a service or action, and the like.

In some cases, virtual assistant service 106 may commence, but not complete a task on behalf of the user. For example, where the task is to call a utility provider to inquire about a recent bill, virtual assistant service 106 may establish a trust relationship with the utility provider customer service department (e.g., remote service 122), and transfer the call to the user when a customer service department agent has been reached. In this example, virtual assistant service 106 initiates contact with the customer service department, authenticates the user with the customer service department, and transfers the call between departments all without user interaction and without the user waiting on hold. Beneficially, this reduces the time the user is on the call and the user may proceed to directly inquiring about their recent bill.

Figure 2:
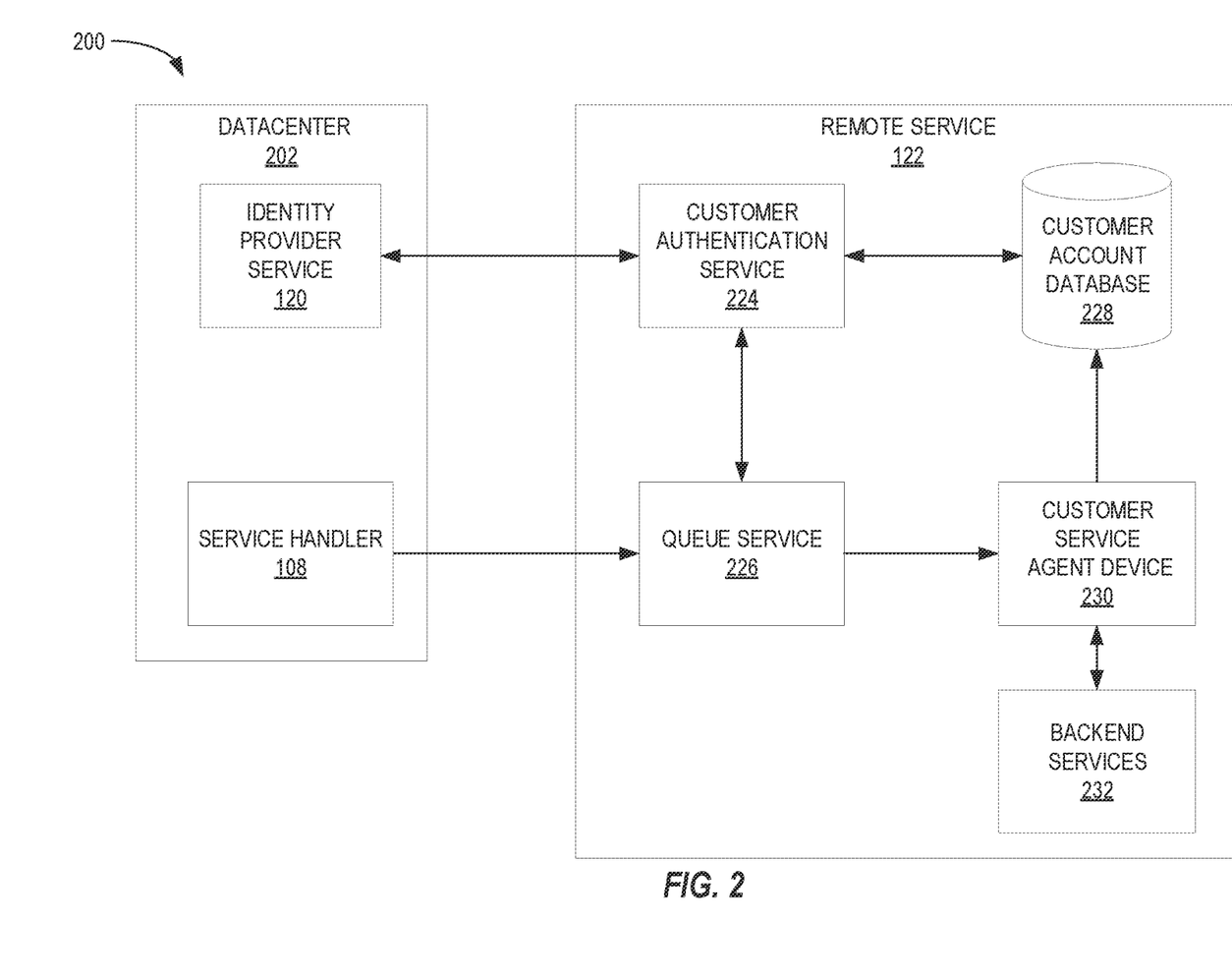
FIG. 2 depicts another example system for establishing trust of a virtual assistant.

FIG. 2 depicts further aspects of a remote service for establishing trust with a virtual agent through an example data flow 200 for establishing trust of a virtual assistant.

Generally, all like numbered aspects of FIG. 2 are as described in FIG. 1. In the depicted example, remote service 122 comprises queue service 226, customer authentication service 224, customer account database 228, customer service agent device 230, and backend services 232.

Queue service 226 is generally configured to receive a communication session from service handler 108 on a communication channel, such as a call, email, social media communication, text message, or live chat from a virtual assistant.

Queue service 226 is further configured to query customer authentication service 224 to determine whether the user is authenticated before sending the communication session to a customer service agent using a customer service agent device 230. In some embodiments, to determine whether a user is authenticated, customer authentication service 224 queries identity service provider 120. A communication session authentication query sent by customer authentication service 224 asks identity service provider whether the communication session was registered with identity provider service 120. Customer authentication service 224 provides contact information for the selected communication channel (e.g., an origin telephone number, email account, social media account, or chat identity) associated with the communication session with the communication session authentication query. Identity provider service 120 then determines whether the communication session was registered with identity provider service 120 based on the provided contact information for the selected communication channel.

If the communication session was not registered with identity provider service 120, then customer authentication service 224 receives, from identity provider service 120, an indication that the communication session is unexpected and the user is unauthenticated. Customer authentication service 224 then indicates to queue service 226 the user is unauthenticated. Queue service 226 may then transfer the communication session to a customer service agent device 230 as unauthenticated. In some embodiments, a customer service agent using customer service agent device 230 may then directly authenticate the user.

If the contact information is associated with a registered communication session, then customer authentication service 224 receives proof of user authentication from identity provider service 120. Customer authentication service 224 may then trust the user was authenticated by identity provider service 120, without needed to authenticate the user directly. This reduces the number of times a user needs to be authenticated while maintaining security.

In some embodiments, the proof of user authentication authorizes the performance of a task on behalf of the user. For example, the proof of user authentication may authorize access to a customer account or authorize a transaction with that account. In some embodiments, the proof of user authentication comprises an indication that a virtual assistant (e.g., virtual assistant service 106 in FIG. 1), is authorized to perform a specific task on behalf of the user. For example, the proof of user authentication may indicate the virtual assistant is authorized to make a particular payment to a particular recipient on a customer account.

Customer authentication service 224 may use the proof of user authentication to look up a user in a customer account database 228 to find customer account information. Customer account information and the proof of user authentication are then sent to a customer service agent device 230 and backend services 232, to establish trust for the communication session. In some embodiments, a customer service agent may use customer account information and the proof of user authentication during a trusted communication session to perform an authorized task.

Example Method for Establishing a Trust Relationship

Figure 3:
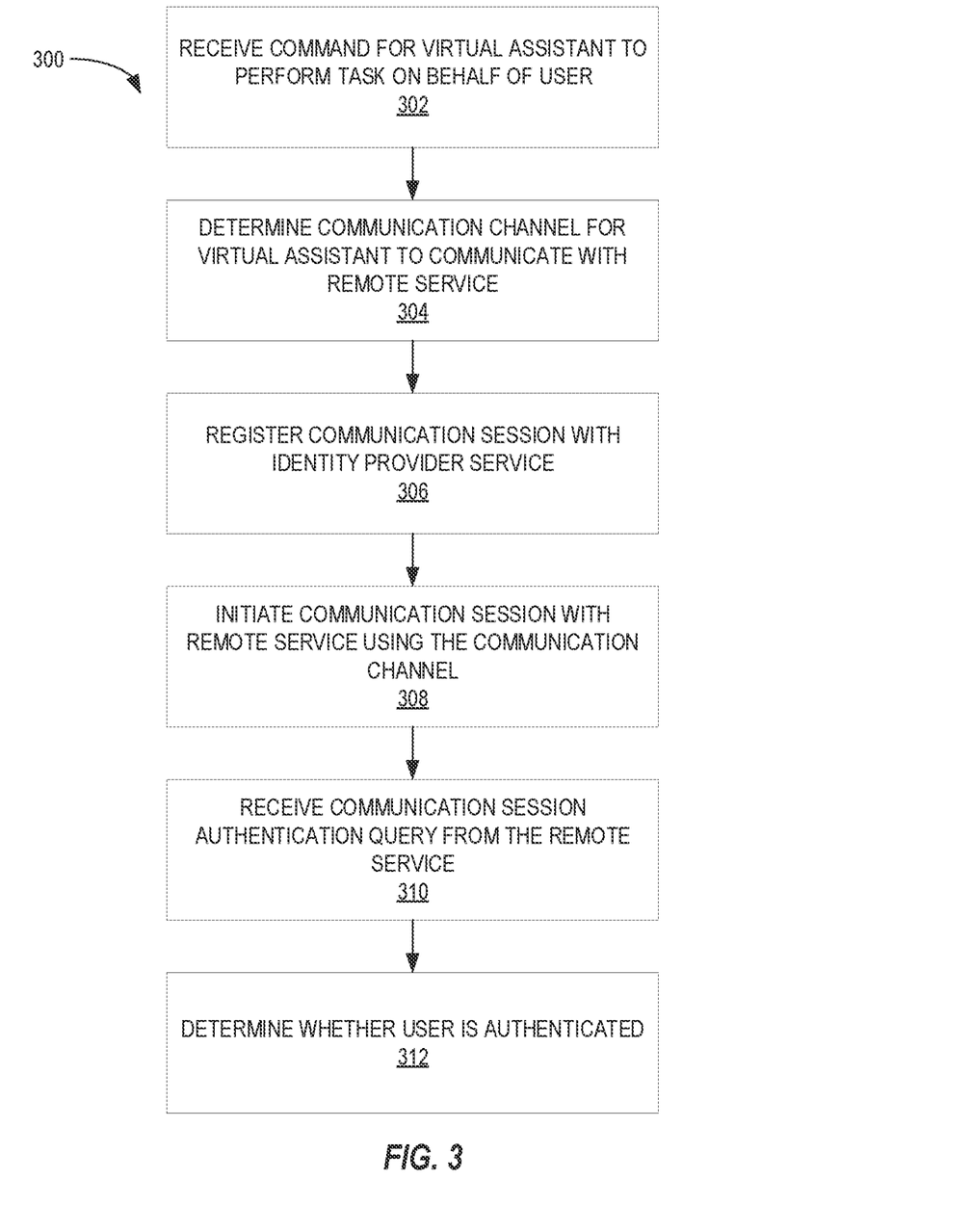
FIG. 3 depicts an example method for determining user authentication.

FIG. 3 depicts an example method 300 for determining user authentication for a virtual assistant service.

Method 300 begins at step 302 with receiving, from a user, a command for a virtual assistant to perform a task on behalf of a user. For example, a user may use a user device (e.g., user device 102 in FIG. 1) to connect with a virtual assistant (e.g., virtual assistant service 106 in FIG. 1) to perform a task on the user's behalf, such as contacting a customer service department.

In some embodiments, method 300 further comprises authenticating the user with an identity provider service; and obtaining proof of user authentication from the identity provider service. An identity provider service may authenticate the user, for example, through password-based authentication, multi-factor authentication, certificate-based authentication, biometric authentication, token-based authentication, or any other method of user authentication. In some embodiments, the identity provider service authenticates the user with an external identification provider and receives the proof of user authentication from the external identification provider.

In some embodiments, method 300 further comprises storing the proof of user authentication in an account associated with the user, such as in user account database 118 in FIG. 1. In some embodiments, the proof of user authentication comprises a token. In some embodiments, the token may be signed and expire after a set time period, which beneficially reduces the chance of an initially authorized but later compromised virtual assistant performing an unauthorized task.

Method 300 then proceeds to step 304 with determining a communication channel for the virtual assistant to communicate with a remote service in order to perform the task. For example, a virtual assistant determines a communication channel to communicate with a customer service department (e.g., remote service 122 in FIG. 1). In some embodiments, the communication channel comprises one of: a phone call; an email; a social media communication; a text message; or a live chat.

Method 300 then proceeds to step 306 with registering a communication session with an identity provider service (e.g., identity provider service 120 in FIG. 1), wherein the communication session is associated with the communication channel.

Method 300 then proceeds to step 308 with initiating the communication session with the remote service using the communication channel.

In some embodiments, initiating the communication session with the remote service using the communication channel comprises selecting a service handler configured to perform the communication session using the communication channel. Examples of service handlers include an outbound call service (e.g., outbound call service 110 in FIG. 1); an email client service (e.g., email client service 112 in FIG. 1); a social channel service (e.g., social channel service 114 in FIG. 1); and a live chat service (e.g., live chat service 116 in FIG. 1).

Method 300 then proceeds to step 310 with receiving a communication session authentication query from the remote service. In some embodiments, the communication session authentication query is received by the identity provider service. For example, as described above, identity provider service 120 of FIGS. 1 and 2 may receive a communication session authentication query from customer authentication service 224 of FIG. 2.

In some embodiments, method 300 further comprises determining, in response to the communication session authentication query, whether the communication session is registered with the identity provider service. Determining whether a communication session is registered, in some embodiments, comprises receiving a query of whether the communication channel is associated with a registered communication session.

For example, an identity provider service receives a query of whether an origin phone number is associated with a registered communication session. In another example, an identity provider service receives a query of whether an email account is associated with a registered communication session. In yet another example, an identity provider service receives a query of whether a social media account is associated with a registered communication session. As another example, an identity provider service receives a query of whether a chat identity is associated with a registered communication session.

Method 300 then proceeds to step 312 with determining, in response to the communication session authentication query, whether the user is authenticated.

In some embodiments, determining whether the user is authenticated comprises determining that the user is not authenticated; and method 300 further comprises sending an indication to the remote service (e.g., customer authentication service 224 in FIG. 2) that the user is not authenticated. The remote service may, for example, continue with a communication session that is not authenticated, however, the remote service may require a user to be directly authenticated by the remote service, such as described in FIG. 2.

In some embodiments, determining whether the user is authenticated comprises determining that the user is authenticated; and method 300 further comprises sending proof of user authentication to the remoter service in order to authorize the remote service to perform the task on behalf of the user.

Note that method 300 is one example, and other flows including additional, alternative, or fewer steps, or steps in a different order, are possible consistent with the various aspects described herein.

Example Method for Receiving Proof of User Authentication

Figure 4:
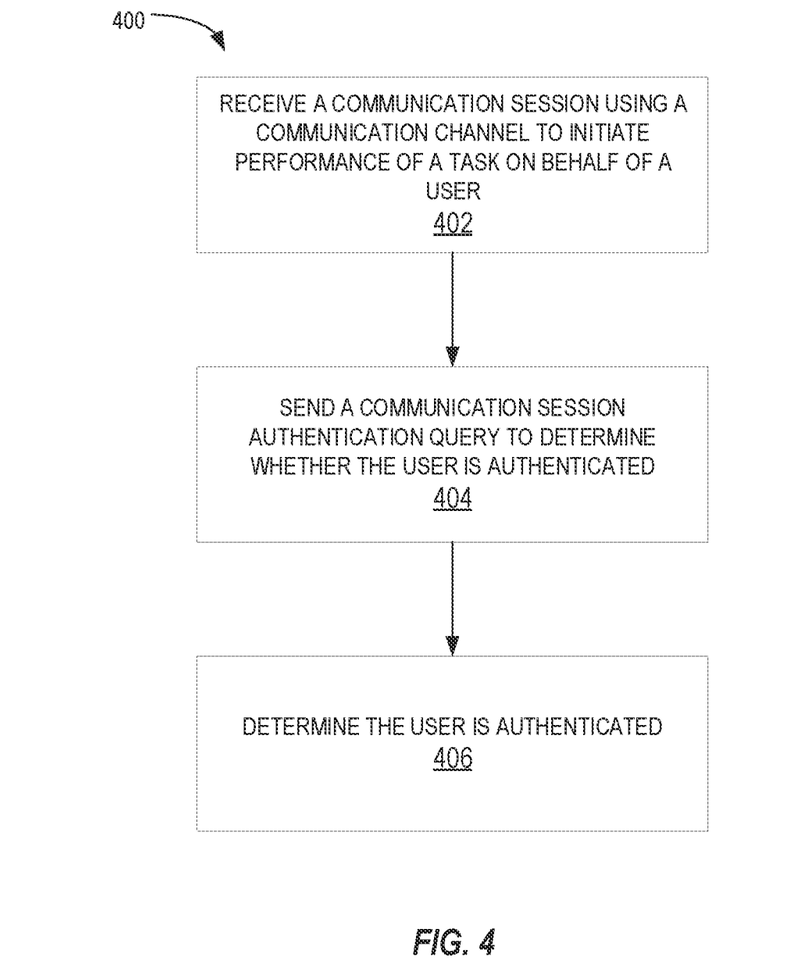
FIG. 4 an example method for receiving proof of user authentication.

FIG. 4 depicts an example method 400 for receiving proof of user authentication, such as by a queue service 226 of a remote service 122, as described above with respect to FIG. 2.

Method 400 begins at step 402 with receiving a communication session using a communication channel to initiate performance of a task on behalf of a user. For example, a queue service (e.g., queue service 226 in FIG. 2), may receive a communication, such as a telephone call, an email, a social media communication, a text message or a live chat.

Method 400 proceeds to step 404 with sending a communication session authentication query to determine whether the user is authenticated. For example, a customer authentication service (e.g., customer authentication service 224 in FIG. 2), may query an identity provider service for user authentication.

Method 400 proceeds to step 406 with determining whether the user is authenticated.

In some embodiments, determining the user is authenticated comprises verifying the communication channel is associated with a registered communication session, such as with identity provider service 120 in FIG. 2.

In some embodiments, method 400 further comprises receiving an indication that the user is not authenticated, such as from identity provider service 120 in FIG. 2.

In some embodiments, method 400 further comprises receiving proof of user authentication, wherein the proof authorizes the performance of the task on behalf of the user, such as described above with respect to FIG. 2.

In some embodiments, the proof of user authentication comprises an indication that a virtual assistant is authorized to perform the task on behalf of the user. An authorization may be task specific, for example, authorizing a virtual assistant to retrieve account information, update account information, or complete a transaction. A task-specific authorization provides assurance to a third party (e.g., remote service 122) that the user intended a virtual assistant to perform the task on their behalf or the extent to which a virtual assistant may perform a task on their behalf.

Note that method 400 is just one example, and other flows having additional, fewer, alternative, or differently ordered steps may be implemented.

Example Processing System for Establishing a Trust Relationship

Figure 5:
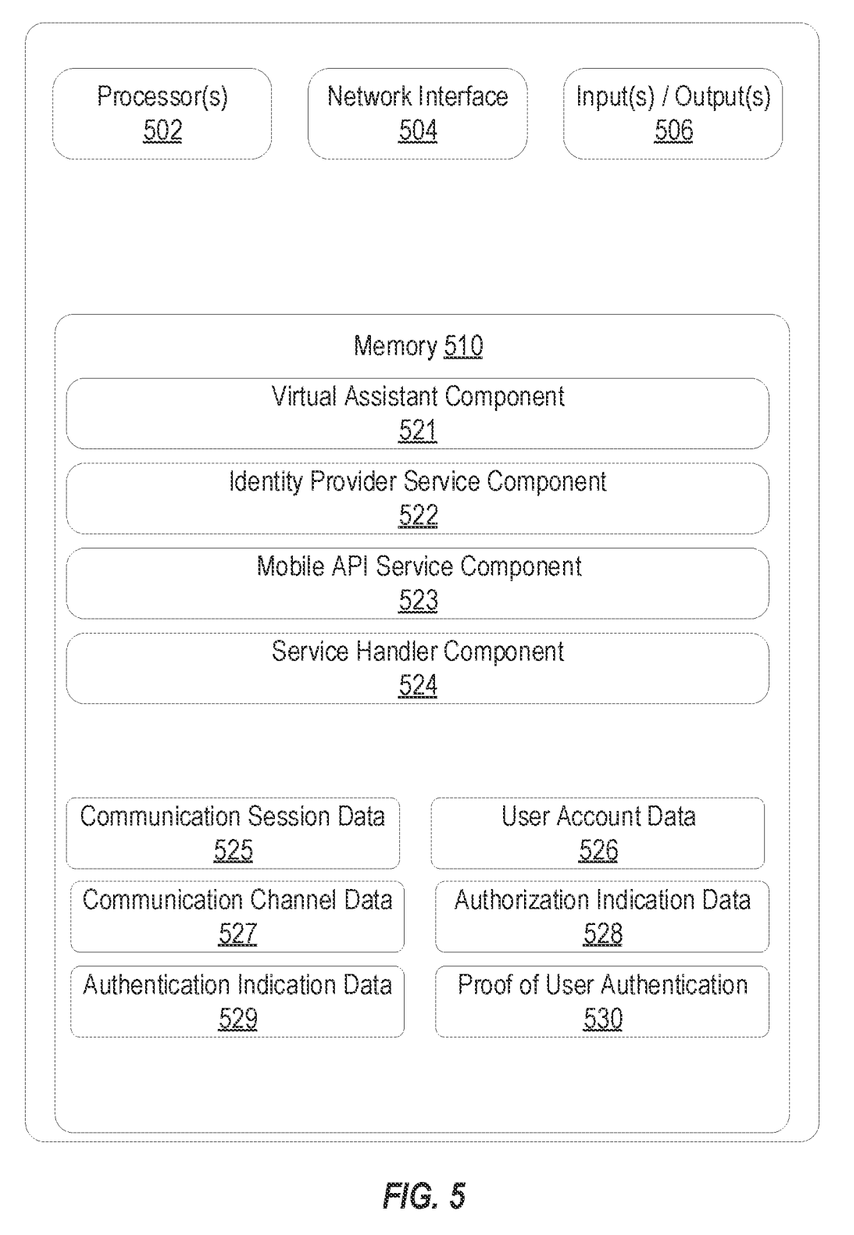
FIG. 5 depicts an example processing system configured to perform the methods described herein.

FIG. 5 depicts an example processing system configured to perform the methods described herein.

Processing system 500 includes one or more processors 502. Generally, a processor 502 is configured to execute computer-executable instructions (e.g., software code) to perform various functions, as described herein.

Processing system 500 further includes a network interface 504, which generally provides data access to any sort of data network, including personal area networks (PANs), local area networks (LANs), wide area networks (WANs), the Internet, and the like.

Processing system 500 further includes input(s) and output(s) 506, which generally provide means for providing data to and from processing system 500, such as via connection to computing device peripherals, including user interface peripherals.

Processing system further includes a memory 510 comprising various components. In this example, memory 510 includes a virtual assistant component 521 (such as component 106 of FIG. 1), an identity provider service component 522 (e.g., component 120 of FIG. 1), mobile API service component 523 (e.g., component 104 of FIG. 1), service handler component 524 (e.g., component 108 of FIG. 1), communication session data 525, user account data 526, communication channel data 527, authorization indication data 528, authentication indication data 529, and proof of user authentication 530.

Processing system 500 may be implemented in various ways. For example, processing system 500 may be implemented within on-site, remote, or cloud-based processing equipment. Note that in various implementations, certain aspects may be omitted, added, or substituted from processing system 500.

Example Clauses

Clause 1: A method, comprising: receiving, from a user, a command for a virtual assistant to perform a task on behalf of the user; determining a communication channel for the virtual assistant to communicate with a remote service in order to perform the task; registering a communication session with an identity provider service, wherein the communication session is associated with the communication channel; initiating the communication session with the remote service using the communication channel; receiving a communication session authentication query from the remote service; and determining, in response to the communication session authentication query, whether the user is authenticated.

Clause 2: The method of Clause 1, wherein: determining whether the user is authenticated comprises determining that the user is not authenticated; and the method further comprises sending an indication to the remote service that the user is not authenticated.

Clause 3: The method of Clause 1, wherein: determining whether the user is authenticated comprises determining that the user is authenticated; and the method further comprises sending proof of user authentication to the remote service in order to authorize the remote service to perform the task on behalf of the user.

Clause 4: The method of any one of Clause 1-3, wherein the proof of user authentication comprises an indication that the virtual assistant is authorized to perform a task on behalf of the user.

Clause 5: The method of any one of Clause 1-4, further comprising: authenticating the user with the identity provider service; and obtaining the proof of user authentication from the identity provider service.

Clause 6: The method of any one of Clause 1-5, further comprising storing the proof of user authentication in an account associated with the user.

Clause 7: The method of any one of Clause 1-6, wherein the proof of user authentication comprises a token.

Clause 8: The method of any one of Clause 1-7, further comprising determining, in response to the communication session authentication query, that the communication session is registered with the identity provider service.

Clause 9: The method of any one of Clause 1-8 wherein the communication session authentication query is received by the identity provider service.

Clause 10: The method of any one of Clause 1-9, wherein the communication channel comprises one of: a phone call; an email; a social media communication; a text message; or a live chat.

Clause 11: The method of any one of Clause 1-10, wherein initiating the communication session with the remote service using the communication channel comprises selecting a service handler configured to perform the communication session using the communication channel.

Clause 12: The method of any one of Clause 1-11, wherein the service handler comprises one of: an outbound calling service; an email client service; a text messaging service; a live chat client service; or a social channel service.

Clause 13: A method, comprising: receiving a communication session using a communication channel to initiate performance of a task on behalf of a user; sending a communication session authentication query to determine whether the user is authenticated; and determining the user is authenticated.

Clause 14: The method of Clause 13, further comprising: receiving an indication the user is not authenticated.

Clause 15: The method of any one of Clause 13-14, further comprising: receiving proof of user authentication, wherein the proof authorizes the performance of the task on behalf of the user.

Clause 16: The method of any one of Clause 13-15, wherein the proof of user authentication comprises an indication that a virtual assistant is authorized to perform the task on behalf of the user.

Clause 17: The method of any one of Clause 13-16, wherein determining the user is authenticated, comprises verifying the communication channel is associated with a registered communication session.

Clause 18: An apparatus, comprising: a memory comprising computer-executable instructions; a processor configured to execute the computer-executable instructions and cause the apparatus to perform a method in accordance with any one of Clauses 1-17.

Clause 19: An apparatus, comprising means for performing a method in accordance with any one of Clauses 1-17.

Clause 20: A non-transitory computer-readable medium comprising computer-executable instructions that, when executed by one or more processors of a processing system, cause the processing system to perform a method in accordance with any one of Clauses 1-17.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
receiving, from a user, a command for a virtual assistant to perform a task on behalf of the user;
determining a communication channel for the virtual assistant to communicate with a remote service in order to perform the task;
registering a communication session with an identity provider service, wherein the communication session is associated with the communication channel;
initiating the communication session with the remote service using the communication channel in order to perform the task on behalf of the user with the remote service;
receiving a communication session authentication query from the remote service;
determining, in response to the communication session authentication query, the user is authenticated, wherein user authentication indicates the virtual assistant is authorized to perform of the task on behalf of the user with the remote service; and
initiating, based on determining the user is authenticated, performance of the task on behalf of the user with the remote service.

2. The method of claim 1, further comprising:
sending proof of user authentication to the remote service in order to authorize the remote service to perform the task on behalf of the user.

3. The method of claim 2, further comprising:
authenticating the user with the identity provider service; and
obtaining the proof of user authentication from the identity provider service.

4. The method of claim 2, further comprising storing the proof of user authentication in an account associated with the user.

5. The method of claim 2, wherein the proof of user authentication comprises a token.

6. The method of claim 2, further comprising transferring the communication session to the user to complete the task.

7. The method of claim 1, further comprising determining, in response to the communication session authentication query, that the communication session is registered with the identity provider service.

8. The method of claim 1, wherein the communication session authentication query is received by the identity provider service.

9. The method of claim 1, wherein the communication channel comprises one of:
a phone call;
an email;
a social media communication;
a text message; or
a live chat.

10. The method of claim 1, wherein initiating the communication session with the remote service using the communication channel comprises selecting a service handler configured to perform the communication session using the communication channel.

11. The method of claim 10, wherein the service handler comprises one of:
an outbound calling service;
an email client service;
a text messaging service;
a live chat client service; or
a social channel service.

12. The method of claim 1, the communication channel is determined based on one or more of:
a characteristic of the task;
a type of communication channel for which the virtual assistant is trained;
a characteristic of the remote service; or
an expected wait time of the communication channel.

13. A method, comprising:
receiving a communication session using a communication channel to initiate performance of a task on behalf of a user by a virtual assistant;
sending a communication session authentication query to determine whether the user is authenticated;
determining the user is authenticated based on receiving proof of user authentication, wherein the proof of user authentication authorizes the performance of the task on behalf of the user; and
initiating, based on determining the user is authenticated, performance of the task on behalf of the user by the virtual assistant.

14. The method of claim 13, further comprising:
receiving an indication the user is not authenticated.

15. The method of claim 13, wherein determining the user is authenticated, comprises verifying the communication channel is associated with a registered communication session.

16. The method of claim 13, further comprising:
determining, based on the proof of user authentication, customer account information associated with the user.

17. An apparatus, comprising:
a memory comprising computer-executable instructions;
a processor configured to execute the computer-executable instructions and cause the apparatus to:
receive a command for a virtual assistant to perform a task on behalf of a user,
determine a communication channel for the virtual assistant to communicate with a remote service in order to perform the task;
register a communication session with an identity provider service, wherein the communication session is associated with the communication channel;
initiate the communication session with the remote service using the communication channel in order to perform the task on behalf of the user with the remote service;
receive a communication session authentication query from the remote service;
determine, in response to the communication session authentication query, the user is authenticated, wherein user authentication indicates the virtual assistant is authorized to perform of the task on behalf of the user with the remote service; and
initiate, based on determining the user is authenticated, performance of the task on behalf of the user with the remote service.

18. The apparatus of claim 17, wherein the processor is further configured to cause the apparatus to determine, in response to the communication session authentication query, that the communication session is registered with the identity provider service.

19. The apparatus of claim 17, wherein in order to determine whether the user is authenticated, the processor is further configured to cause the apparatus to:
send proof of user authentication to the remote service in order to authorize the remote service to perform the task on behalf of the user.

* * * * *